(12) United States Patent
Smith

(10) Patent No.: US 6,614,637 B1
(45) Date of Patent: Sep. 2, 2003

(54) APPARATUS AND METHOD FOR A DISCHARGE INTERRUPT CIRCUIT THAT CAN OPERATE AT A LOW SUPPLY VOLTAGE

(75) Inventor: Gregory J. Smith, Tucson, AZ (US)

(73) Assignees: National Semiconductor Corporation, Santa Clara, CA (US); Motorola, Inc., Schaumburg, IL (US)

( * ) Notice: Subject to any disclaimer, the term of this patent is extended or adjusted under 35 U.S.C. 154(b) by 184 days.

(21) Appl. No.: 09/909,607

(22) Filed: Jul. 20, 2001

(51) Int. Cl.[7] .............................................. H02H 3/087
(52) U.S. Cl. ...................... 361/93.1; 361/93.9; 361/101
(58) Field of Search ........................... 361/79, 87, 93.1, 361/93.4, 93.8, 93.9, 93.7, 100, 101; 323/276, 277

(56) References Cited

U.S. PATENT DOCUMENTS 5,550,702 A * 8/1996 Schmidt et al. ............ 361/93.8
5,710,508 A * 1/1998 Watanabe .................... 361/87
5,903,422 A * 5/1999 Hosokawa ................ 361/93.1

* cited by examiner

*Primary Examiner*—Jessica Han
(74) *Attorney, Agent, or Firm*—Merchant & Gould P.C.; Joshua W. Korver

(57) ABSTRACT

A discharge interrupt circuit and method is directed to short circuit protection for an electronic circuit that includes a load regulation device that is arranged to normally provide an output current. The discharge interrupt circuit detects a short circuit condition by monitoring the voltage across the load regulation device. When a short circuit is detected, a logic circuit within the discharge interrupt circuit latches the short circuit condition in a memory circuit and disables the load regulation device such that the output current is interrupted from flowing. The logic circuit re-enables the load regulation device when the logic circuit has determined that the device has been deactivated. A time-out circuit can also be used add an additional delay between the load regulation device being disabled and re-enabled. The discharge interrupt circuit provides short circuit protection with power supply voltages less than 1V.

30 Claims, 7 Drawing Sheets

APPARATUS AND METHOD FOR A DISCHARGE INTERRUPT CIRCUIT THAT CAN OPERATE AT A LOW SUPPLY VOLTAGE

FIELD OF THE INVENTION

The present invention relates to the field of short circuit protection circuitry, and in particular, to a discharge interrupt circuit capable of operating at a low supply voltage.

BACKGROUND OF THE INVENTION

An integrated circuit is often constructed from a small chip of semiconductor material upon which an array of active/passive components have been constructed and connected together to form a functioning circuit. The integrated circuit is generally encapsulated in a plastic housing (chip) with signal, power supply, and control pins accessible for connection to external electronic circuitry. Input signals transmitted to the integrated circuit via selected input pins are processed by active and passive components that are designed with a limited range of supply voltages available for optimal performance.

Battery-powered devices often employ integrated circuitry to regulate the power provided by a battery cell. Linear voltage regulators are often used where the input power source is unregulated or clean power is required in a noisy environment. A linear voltage regulator may use an amplifier to attenuate the supply voltage.

Non-ideal properties may have little or no impact when a circuit is operating at the rated supply voltage. However, when the supply voltage sags to a level far below the rated supply voltage, these non-ideal properties may have a larger impact. An example of a non-ideal property is the associated impedances of transistors, and a battery cell in a circuit. The negative impact of the voltage divider created by these impedances on the operation of the circuit can increase when the supply voltage sags.

For example, when the battery is shorted to ground, an undesirable, large discharge of current can occur. A short circuit event can occur faster than a regulatory circuit can react to the event. The performance of the regulator circuit can be affected and the discharge of current may itself cause a sag in the supply voltage. In addition, the discharge of current may itself cause a sag in the supply voltage. Also, a shorted battery cell may be inadequate to supply power to operate the circuit.

SUMMARY OF THE INVENTION

The invention is directed to a discharge interrupt circuit that provides short circuit protection for a regulator circuit that includes a load regulation device. The discharge interrupt circuit detects a high output current or short circuit condition in the device and diverts the output current from the load by deactivating the device. Logic included in the discharge interrupt circuit is arranged to return the device to normal operation once the short circuit condition is removed. The discharge interrupt circuit provides short circuit protection that can operate at low power supply voltages.

Briefly stated, a discharge interrupt circuit and method is directed to short circuit protection for an electronic circuit that includes a load regulation device that is arranged to normally provide an output current. The discharge interrupt circuit detects a short circuit condition by monitoring the drain-source voltage across the load regulation device. When a short circuit is detected, a logic circuit within the discharge interrupt circuit latches the short circuit condition in a memory circuit and disables the load regulation device such that the output current is interrupted from flowing. The logic circuit re-enables the load regulation device when the logic circuit has determined that the device has been deactivated. A time-out circuit can also be used add an additional delay between the load regulation device being disabled and re-enabled. The discharge interrupt circuit provides short circuit protection with power supply voltages less than 1V.

In an embodiment of the invention, an apparatus provides over-current protection to a regulator circuit that includes a load regulation device. The load regulation device is arranged to regulate a current flow through the load regulation device from a power source in response to a control signal that is produced by a control circuit. A sensor circuit is configured to sense the current flow through the load regulation device. A switching circuit is coupled to the sensor circuit and a logic circuit is coupled to the switching circuit. The logic circuit is configured to activate the switching circuit in response to the occurrence of a short circuit event. The logic circuit is also configured to deactivate the switching circuit after the load regulation device is substantially deactivated. A disable circuit is coupled to the switching circuit. The disable circuit is configured to deactivate the load regulation device when the switching circuit is active. The disable circuit deactivates the load regulation device by enabling a transistor in an output stage of the control circuit such that the load regulation device is deactivated, whereby the regulator circuit is protected from the over-current event.

Another embodiment of the invention relates to a method for providing short circuit protection to a regulator circuit that regulates a current flow through a load regulation device. The method comprises: detecting the occurrence of a short circuit condition, setting a latch to indicate the occurrence of the short circuit condition, disabling the load regulation device when the latch is set such that the current flow through the load regulation device is interrupted, monitoring the load regulation device to determine when the load regulation device is substantially deactivated, resetting the latch when the load regulation device is substantially deactivated, and enabling the load regulation device after the latch is reset such that the regulator circuit regulates the current flow with the load regulation device.

In yet another embodiment of the invention, an apparatus provides short circuit protection to a regulator circuit that regulates a current flow through a load regulation device. The apparatus includes a means for detecting that is configured to detect an occurrence of a short circuit condition within the regulator circuit. A means for setting a latch is configured to set a latch to indicate the occurrence of the short circuit condition. A means for disabling the load regulation device is configured to disable the load regulation device when the latch is set such that the regulator circuit is disabled. A means for monitoring the load regulation device is configured to determine when the load regulation device is substantially deactivated. A means for resetting the latch is configured to reset the latch when the load regulation device is substantially deactivated. A means for enabling the load regulation device is configured to enable the load regulation device after the latch is reset such that the regulator circuit regulates the current flow with the load regulation device.

DETAILED DESCRIPTION OF THE PREFERRED EMBODIMENT

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal or data signal. The meaning of "a", "an", and "the" include plural references. The meaning of "in" includes "in" and "on".

The invention includes a discharge interrupt circuit that is coupled to a load regulation device. The load regulation device regulates a current flow to a load from a power supply. In one embodiment, the power supply is a battery cell. The discharge interrupt circuit activates in response to the occurrence of a short circuit or its equivalent. When the discharge interrupt circuit activates, a current is diverted away from the load by deactivating the load regulation device. Therefore, the discharge interrupt circuit detects the short circuit condition and provides short circuit protection by deactivating the load regulation device. The discharge interrupt circuit is capable of operating at a low power supply voltage, with the ability to deactivate the load regulation device at a power supply voltage below 1V. After a period of time where the current flow top the load has been interrupted, logic deactivates the discharge interrupt circuit. When the discharge interrupt circuit is deactivated, the load regulation device is reactivated and the current redirected to the load.

Figure 1:
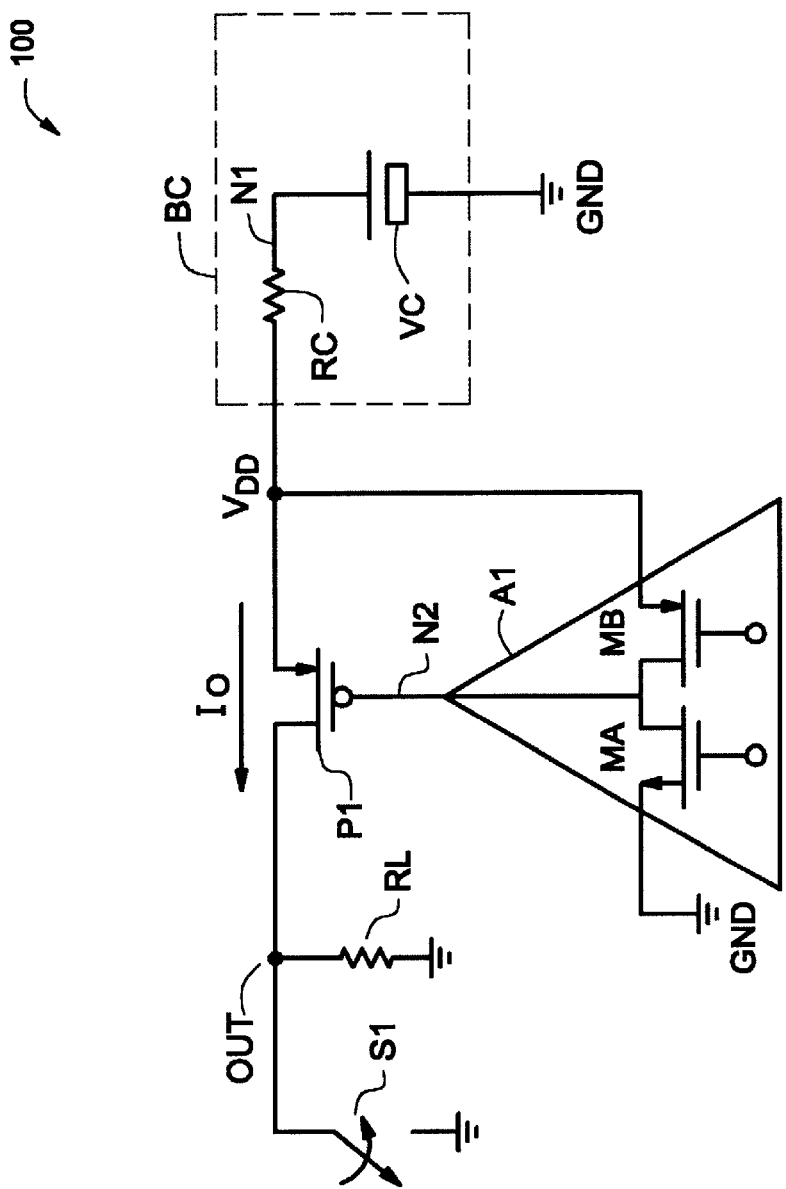
FIG. 1 illustrates a schematic diagram of a battery cell coupled to a control circuit.

FIG. 1 illustrates a schematic diagram of an electronic circuit in accordance with the present invention. The electronic circuit (100) includes a battery cell (BC), a PMOS device (P1), a control circuit or regulator circuit (A1), and a load (RL). The battery cell (BC) is represented by a non-ideal supply including a cell voltage supply (VC) and a cell impedance circuit (RC). The control circuit (A1) includes two transistors (MA, MB) that are part of a complementary output stage for the control circuit. A short circuit event is modeled by the closing of the switch (S1) included at an output node (OUT) in FIG. 1.

The cell voltage supply (VC) is coupled between a ground terminal (GND) and a first node (N1). The cell impedance circuit (RC) is coupled between the first node (N1) and a power supply node (Vdd). The first transistor (MA) of the complementary output stage includes a gate that is coupled to other circuitry within the control circuit (A1), a source that is coupled to the ground terminal (GND), and a drain that is coupled to a second node (N2). The second transistor (MB) of the complementary output stage includes a gate that is coupled to other circuitry within the control circuit (A1), a drain that is coupled to the second node (N2), and a source that is coupled to a power supply node (Vdd). The PMOS device (P1) includes a gate that is coupled to the second node (N2), a source that is coupled to the power supply node (Vdd), and a drain that is coupled to the output node (OUT). The load (RL) is represented by a resistor that is coupled between the output node (OUT) and the ground terminal (GND).

During normal operation, the battery cell (BC) provides energy to the PMOS device (P1) at the power supply node (Vdd). The PMOS device (P1) is arranged to operate as a voltage controlled current source such that load regulation is accomplished by driving the gate of the PMOS device (P1) with a control signal at node N2. The control circuit (A1) is arranged to produce the control signal to effectuate load regulation.

The present invention detects when a short circuit condition occurs in the load (RL). When a short circuit condition occurs, represented by the closing of switch (S1), the current in the PMOS device (P1) increases rapidly. The PMOS device has an associated on resistance (RON) that forms a voltage divider at the power supply node (Vdd) with respect to the cell impedance (RC) of the battery cell (BC). The voltage divider reduces the available power supply voltage at the power supply node (Vdd). Thus, the power supply voltage at the power supply node (Vdd) with a short circuit present is a function of the non-ideal impedances (RC, $R_{ON}$). The supply voltage at the power supply node (Vdd) is obtained by multiplying the potential of the cell voltage supply (VC) by the voltage divider of the non-ideal impedances (RC, $R_{ON}$). The potential of the cell voltage supply (VC) may already be lower than its rated voltage due to a battery drain caused by drain on the battery cell (BC) or other factors. With a low battery cell voltage (VC), the power supply voltage at power supply node (Vdd) may drop below the voltage that is necessary for the control circuit (A1) to operate properly. The control circuit (A1) is provided to regulate an output current (Io) that is delivered to the load (RL) through the PMOS device (P1). If the control circuit (A1) is not operating properly then the output current (Io) through the PMOS device (P1) may no longer be regulated. Providing unregulated current to the load (RL) may degrade circuit performance.

In addition, the speed at which the control circuit (A1) is able to respond to the short circuit event may also be insufficient. A short circuit event may occur faster than the control circuit (A1) can respond. A delayed response by the control circuit (A1) may cause a jump or irregularity in the power delivered from the battery cell (BC) to the load (RL).

Figure 2:
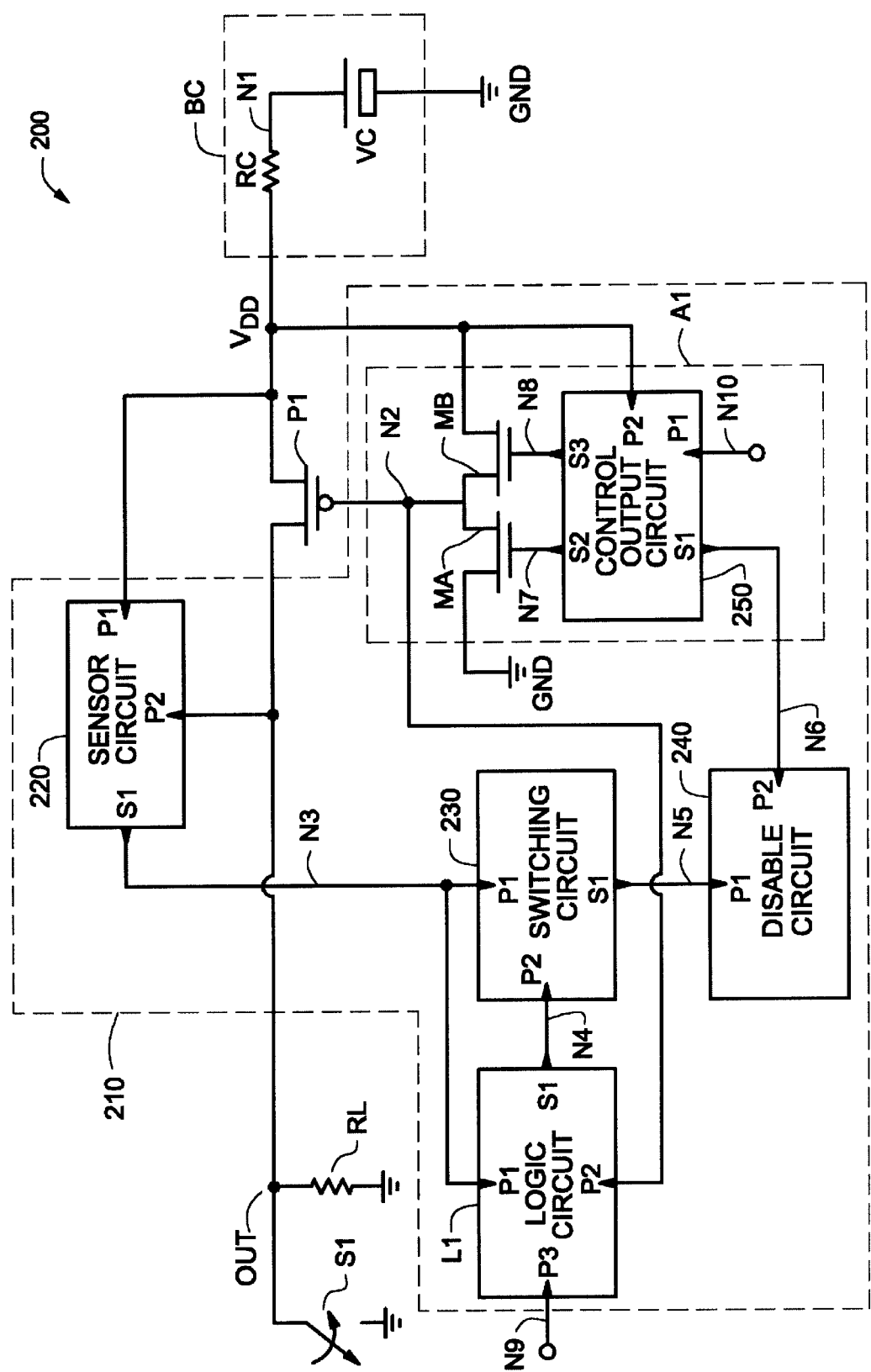
FIG. 2 shows an exemplary schematic diagram of a regulator circuit with a discharge interrupt circuit.

FIG. 2 shows an exemplary schematic diagram of a regulator circuit with a discharge interrupt circuit. The electronic circuit (200) includes the battery cell (BC), a PMOS device (P1), a load (RL), the discharge interrupt circuit (210), and a control circuit (A1). The battery cell (BC) is represented by a non-ideal supply including a cell voltage supply (VC) and a cell impedance circuit (RC). The discharge interrupt circuit (210) includes a sensor circuit (220), a switching circuit (230), a disable circuit (240), a logic circuit (L1), and two transistors (MA, MB) that are part of a complementary output stage for the control circuit (A1) as shown in FIG. 1. The control circuit (A1) in FIG. 2 also includes a control output circuit (250). A short circuit event is modeled by the closing of the switch (SI) included at an output node (OUT).

The cell voltage supply (VC) is coupled between a ground terminal (GND) and a first node (N1). The cell impedance circuit (RC) is coupled between the first node (N1) and a power supply node (Vdd). The PMOS device (P1) includes a gate that is coupled to a second node (N2), a source that is coupled to the power node (Vdd), and a drain that is coupled to the output node (OUT). The load (RL) is represented by a resistor that is coupled between the output node (OUT) and the ground terminal (GND).

In the discharge interrupt circuit (210), the sensor circuit (220) includes a first input (P1) that is coupled to the power supply node (Vdd), a second input (P2) that is coupled to the output node (OUT), and an output (S1) that is coupled to a third node (N3). The switching circuit (230) includes a first input (P1) that is coupled to the third node (N3), a second input that is coupled to a fourth node (N4), and an output (S1) that is coupled to a fifth node (N5). The logic circuit (L1) includes a first input (P1) that is coupled to the third node (N3), a second input that is coupled to the second node (N2), a third input (P3) that is optionally coupled to a ninth node (N9), and an output (S1) that is coupled to the fourth node (N4). The disable circuit (240) includes a first input (P1) that is coupled to the fifth node (N5) and a second input (P2) that is coupled to a sixth node (N6). The control output circuit (250) includes a first input (P1) that is coupled to a tenth node (N10), a second input (P2) that is coupled to the power supply node (Vdd), a first output (S1) that is coupled to the sixth node (N6), a second output (S2) that is coupled to a seventh node (N7), and a third output (S3) that is coupled to an eighth node (N8). The first transistor (MA) of the complementary output stage includes a gate that is coupled to the seventh node (N7), a source that is coupled to the ground terminal (GND), and a drain that is coupled to the second node (N2). The second transistor (MB) of the complementary output stage includes a gate that is coupled to the eighth node (N8), a drain that is coupled to the second node (N2), and a source that is coupled to a power supply node (Vdd).

Sensor Circuit (220) is utilized to track the output signal (Io) flowing from the drain of the PMOS device (P1). In one embodiment, the sensor circuit (220) acts as a voltage detector, detecting the drain-source potential ($V_{DS}$) of the PMOS device (P1). The drain-source potential ($V_{DS}$) of the PMOS device (P1) is dependant on the value of the output signal (Io) multiplied by the drain-source impedance ($RDS_{ON}$) of the PMOS device when the PMOS device is active. The drain-source potential ($V_{DS}$) of the PMOS device (P1) increases as the output signal (Io) increases. Therefore, by tracking the drain-source potential ($V_{DS}$) of the PMOS device (P1), the output signal (Io) is also tracked by the sensor circuit (220). Once the output signal (Io) reaches a threshold level associated with the sensor circuit (220) the sensor circuit (220) produces a second signal at node N3.

The second signal at node N3 is pulled through the switching circuit (230) by the disable circuit (240) when the switching circuit (240) is activated. The switching circuit (230) is activated in response to the logic circuit (L1). The logic circuit (L1) deactivates or activates the switching circuit (230) in response to the second signal at node N3, the potential at the second node (N2), and an optional signal received at node N9. The logic circuit (L1) returns the electronic circuit (200) to normal operation by changing the state of the switching circuit (230) after the short circuit condition is removed.

The second signal pulled through the switching circuit (230) to fifth node (N5) activates the disable circuit (240). A third signal is pulled from the control output circuit (250) in response to the activation of the disable circuit (240), activating the control output circuit (250). The activation of the control output circuit (250) overrides signals provided to the complementary output stage (MA, MB) through node N10. Transistor MB activates and transistor MA deactivates in response to the activation of the control output circuit (250), overriding the operation of the complementary output stage (MA, MB) as part of the control circuit (A1). Activating transistor MB essentially creates a short circuit across the gate and source of the PMOS device (P1), deactivating the PMOS device (P1), interrupting the increasing output current (Io).

Once the high current caused by the short circuit has been interrupted, the PMOS device (P1) can then be reactivated. Reactivating the PMOS device (P1) returns the electronic circuit (200) to normal operation. To reactivate the PMOS device (P1) the state of the switching circuit (230) is changed. The logic circuit (L1) coupled to switching circuit (230) monitors the potential at the gate of the PMOS device (P1). When the potential at the gate of the PMOS device (P1) reaches a predetermined threshold level, it indicates that the PMOS device (P1) is substantially deactivated. When the logic circuit (L1) determines that the PMOS device (P1) has substantially deactivated, the logic changes the state of the switching circuit (230), deactivating the disable circuit (240). With the disable circuit (240) deactivated, the PMOS device (P1) reactivates. The time period that the PMOS device (P1) is deactivated is the time period for the potential at the gate of the PMOS device (P1) to reach the predetermined threshold level. Therefore, the elapsed time that the PMOS device (P1) is inoperative is self-determined by the electronic circuit (200). This elapsed time may be less than 100 ns, but depends on the sizes of the transistors and PMOS device used.

In light of the above discussion, it is appreciated and understood that the threshold level of the sensor circuit (220) can be adjusted using additional circuitry. Adjusting the threshold level of the sensor circuit (220) allows the discharge interrupt circuit (210) to respond to various changes in the output signal (Io) before activating its short circuit protection. It is also appreciated that the logic circuit can be replaced by another holding circuit that introduce a time interval where the PMOS device (P1) is held deactivated. Such holding circuits may include a delay network or other delay circuit, or a latch or other memory circuit.

Figure 3:
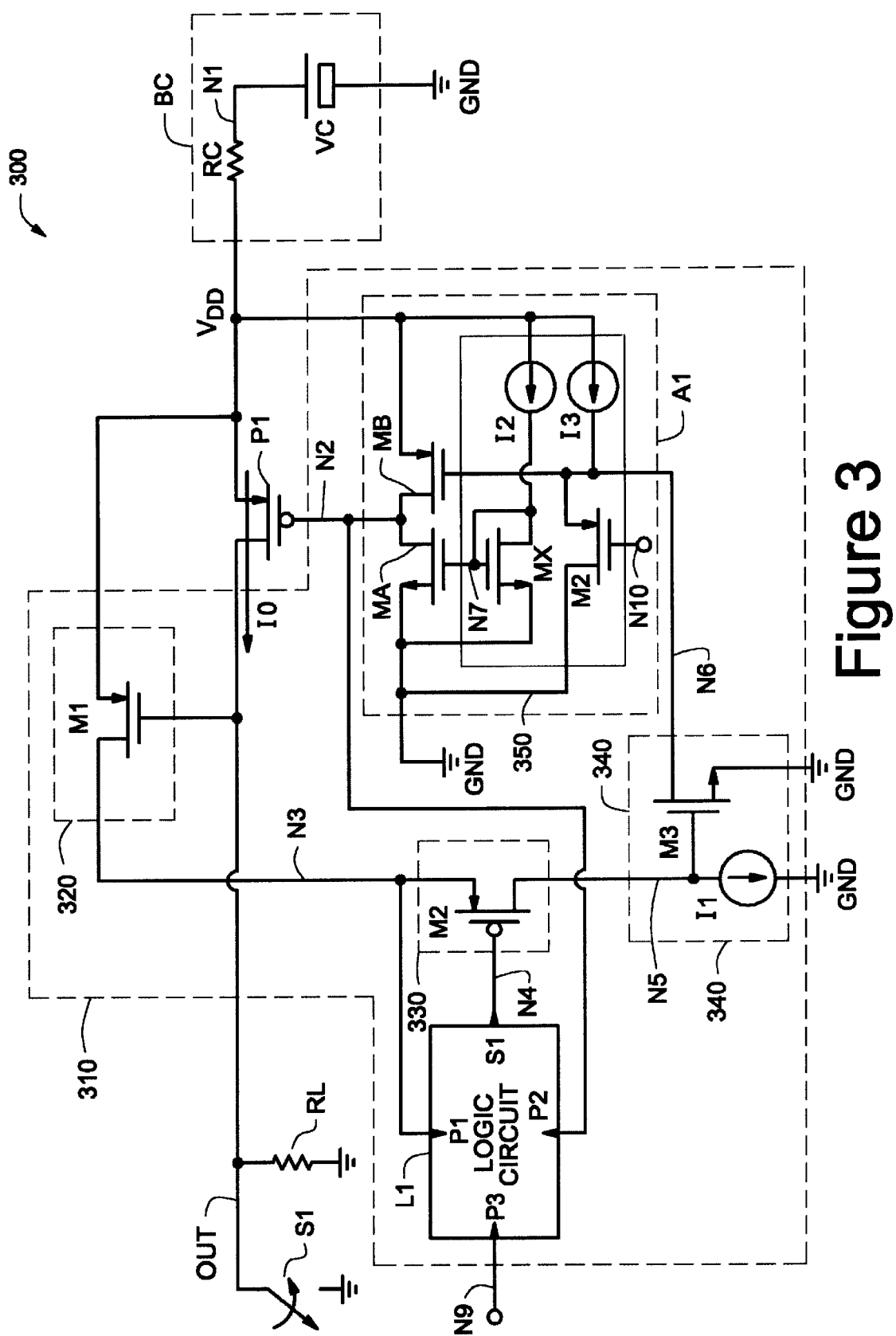
FIG. 3 illustrates another exemplary schematic diagram of regulator circuit with a charge interrupt circuit in greater detail.

FIG. 3 shows an exemplary schematic diagram of a regulator circuit with a discharge interrupt circuit. The electronic circuit (300) includes the battery cell (BC), a PMOS device (P1), a load (RL), the discharge interrupt circuit (310), and a control circuit (A1). The battery cell (BC) is represented by a non-ideal supply including a cell voltage supply (VC) and a cell impedance circuit (RC). The discharge interrupt circuit (310) includes a sensor circuit (320), a switching circuit (330), a disable circuit (340), a logic circuit (L1), and two transistors (MA, MB) that are part of a complementary output stage for the control circuit (A1) as shown in FIG. 1. The control circuit (A1) also includes a control output circuit (350). The sensor circuit (320) includes a transistor M1. The switching circuit (330) includes a transistor M2. The disable circuit (340) includes a transistor M3 and a current source I1. The control output circuit (350) includes two transistors (Mx, Mz) and two current sources (I2, I3). A short circuit event is modeled by the closing of the switch (S1) included at an output node (OUT).

The electronic circuit (300) is connected similarly to the electronic circuit (200) shown in FIG. 2. The cell voltage supply (VC) is coupled between a ground terminal (GND) and a first node (N1). The cell impedance circuit (RC) is coupled between the first node (N1) and a power supply node (Vdd). The PMOS device (P1) includes a gate that is coupled to a second node (N2), a source that is coupled to the power supply node (Vdd), and a drain that is coupled to the output node (OUT). The load (RL) is represented by a resistor that is coupled between the output node (OUT) and the ground terminal (GND).

In the discharge interrupt circuit (310), transistor M1 includes a source that is coupled to the power supply node (Vdd), a gate that is coupled to the output node (OUT), and a drain that is coupled to a third node (N3). Transistor M2 includes a source that is coupled to the third node (N3), a gate that is coupled to a fourth node (N4), and a drain that is coupled to a fifth node (N5). The logic circuit (L1) includes a first input (P1) that is coupled to the third node (N3), a second input that is coupled to the second node (N2), a third input (P3) that is optionally coupled to node N9, and an output (S1) that is coupled to the fourth node (N4). The current source (I1) is coupled between the fifth node (N5) and the ground terminal (GND). Transistor M3 includes a source that is coupled to the ground terminal (GND), a gate that is coupled to the fifth node (N5), and a drain that is coupled a sixth node (N6).

In the control output circuit (350), transistor Mz includes a gate that is coupled to node N10, a source that is coupled to the sixth node (N6), and a drain that is coupled to the ground terminal (GND). Transistor Mx includes a gate and drain that are coupled to a seventh node (N7), and a source that is coupled to the ground terminal (GND). Current source I2 is coupled between the power supply node (Vdd) and the seventh node (N7). Current source I3 is coupled between the power supply node (Vdd) and the sixth node (N6). The complementary output stage (MA, MB) of the control circuit (A1) is included in the discharge interrupt circuit (310), with the gate of transistor MB coupled to the sixth node (N6), and the and the gate of transistor MA coupled to the seventh node (N7).

Transistor M1 is utilized to monitor the output current (Io) flowing from the drain of the PMOS device (P1). The source and gate of transistor M1 is coupled across the source and drain of the PMOS device P1. Transistor M1 operates as a voltage detector that is arranged to detect the drain-source voltage ($V_{DS}$) of the PMOS device (P1). As stated previously in connection with FIG. 2, the drain-source voltage ($V_{DS}$) of the PMOS device (P1) is dependant on the value of the output current (Io) multiplied by the drain-source resistance ($RDS_{ON}$) of the PMOS device (P1) when the PMOS device is active. Thus, the drain-source voltage ($V_{DS}$) of the PMOS device (P1) increases as the output current (Io) increases. As the drain-source voltage ($V_{DS}$) of the PMOS device (P1) increases, the magnitude of the gate-source voltage ($V_{GS}$) of transistor M1 also increases. Transistor M1 is activated when the magnitude of the gate-source voltage ($V_{GS}$) of transistor M1 reaches a predetermined threshold potential.

Current from the power supply node (Vdd) is diverted from the PMOS device (P1) through transistor M1 when transistors M1 and M2 are active. The current is pulled from the drain of transistor M1 and through transistor M2 and the fifth node (N5) by the current source (I1). The logic circuit (L1) returns the electronic circuit (300) to normal operation by changing the gate voltage of transistor M2 to a high logic level (logic "1") after the short circuit current is interrupted, as discussed in greater detail below in relation to FIG. 4.

The potential at the gate of transistor M3 increases in response to current pulled by the current source (I1) through the fifth node (N5). Transistor M3 activates in response to the increase in potential at its gate. Current flows through transistor M3 from the sixth node (N6) to the ground terminal (GND) in response to the activation of transistor M3. Thus, transistor M3 pulls the voltage potential at the sixth node (N6) to ground when active.

Transistor Mz of the control output circuit (350) is arranged to operate as a source follower. Transistor Mz provides a potential at the gate of transistor MB of the complementary output stage that is related to the potential at the gate of Mz. The potential at the gate of Mz is determined by other circuitry (not shown) of the control circuit (A1) coupled to node N10. Also, diode-connected transistor Mx is arranged to operate as an active load that is similar to a resistor that biases transistor MA.

When the potential at node N6 is pulled to ground after the occurrence of a short circuit event, transistor Mz is cutoff. This overrides the normal operation of the control circuit (A1) by preventing signal received at node N10 from reaching the complementary output stage (MA, MB). In addition to disabling the normal operation of the control circuit (A1), transistor MB is activated when the potential at the sixth node (N6) is pulled to ground. Transistor MB is fully activated, essentially creating a short circuit across the gate and source of the PMOS device (P1). The PMOS device (P1) is thus deactivated.

The discharge interrupt circuit (310) has a relatively fast response time when a short circuit appears at the load (RL). The discharge interrupt circuit (310) is arranged to operate at a relatively low supply voltage, such as a voltage of less than 1 volt. The discharge interrupt circuit (310) therefore provides short circuit protection diverting the current from the power supply node (Vdd) deactivating the PMOS device with a relatively fast response time. The short circuit protection operates at a low voltage supply since the parameter for activation of the discharge interrupt circuit (210), in this particular example, is the threshold potential of a single transistor (M1). The threshold potential of a MOSFET transistor is typically less than 1V.

Once the high current caused by the short circuit has been interrupted, the PMOS device (P1) can then be reactivated. Reactivating the PMOS device (P1) returns the electronic circuit (300) to normal operation. To reactivate the PMOS device (P1), the discharge interrupt circuit (310) is deactivated. The logic circuit (L1) monitors the gate potential of the PMOS device (P1) as described in greater detail below in relation to FIG. 4. As more current at the power supply node (Vdd) is diverted through transistor M1, the gate potential of the PMOS device (P1) begins to increase. When the gate potential of the PMOS device (P1) increases above a predetermined threshold level, the PMOS device (P1) is completely deactivated. A typical threshold level at input P2 of the logic circuit (L1) is 100 mV or 50 mV less than the supply voltage, but it is appreciated that another predetermined threshold level may be used. The logic (L1) determines that the PMOS device P1 is completely deactivated by examining its gate potential. The logic circuit (L1) then deactivates transistor M2. By deactivating transistor M2, the logic circuit (L1) also deactivates the discharge interrupt circuit (310). The current provided by the battery cell (BC) is then redirected back through the PMOS device (P1). The short circuit condition may still exist at the time the PMOS device (P1) is reactivated. With the short circuit condition still present in the circuit, the output current (Io) increases to a regulation current threshold (i.e., 4A) established by the control circuit (A1). This allows the control circuit (A1) to regulate the output current (Io) from a zero level rather than from a high level current, or short circuit current, caused by the short circuit event. This avoids the extended delivery of a high current to the load (RL), which may damage the load (RL). The time period that the PMOS device is deactivated corresponds to the time period required for the gate voltage of the PMOS device (P1) to reach the specified threshold. Therefore, in this embodiment, the elapsed time that the PMOS device P1 is inoperative is self-determined by the electronic circuit (300). This elapsed time may be less than 100 ns, but depends on the sizes of the transistors used.

In light of the above discussion, it is appreciated and understood that the threshold level of transistor M1 can be adjusted by adjusting the size of transistor M1 or through the use of additional circuitry. For example, a transistor having a series resistance between its source and the power supply node (Vdd) can be used. The series resistance increases the threshold level of the transistor such that an increased amount of output current (Io) is required to trigger the discharge interrupt circuit (210). Adjusting the threshold of transistor M1 allows the discharge interrupt circuit (210) to respond to various predetermined levels of the output current (Io) before activating its short circuit protection.

In addition, it is appreciated that the current source (I1) can be replaced by another circuit element, such as a resistor, to pull current through transistor M2. The control output circuit (350) may also have an alternative configuration. For example, an NMOS transistor with a source coupled to the ground terminal (GND) and a drain at the gate of transistor MA can be included. Activating the NMOS transistor causes the voltage at the gate of MA to drop to ground, causing transistor MA to be cutoff. Activating this NMOS transistor when the discharge interrupt circuit (310) is active further assists in deactivating PMOS device (P1).

Figure 4:
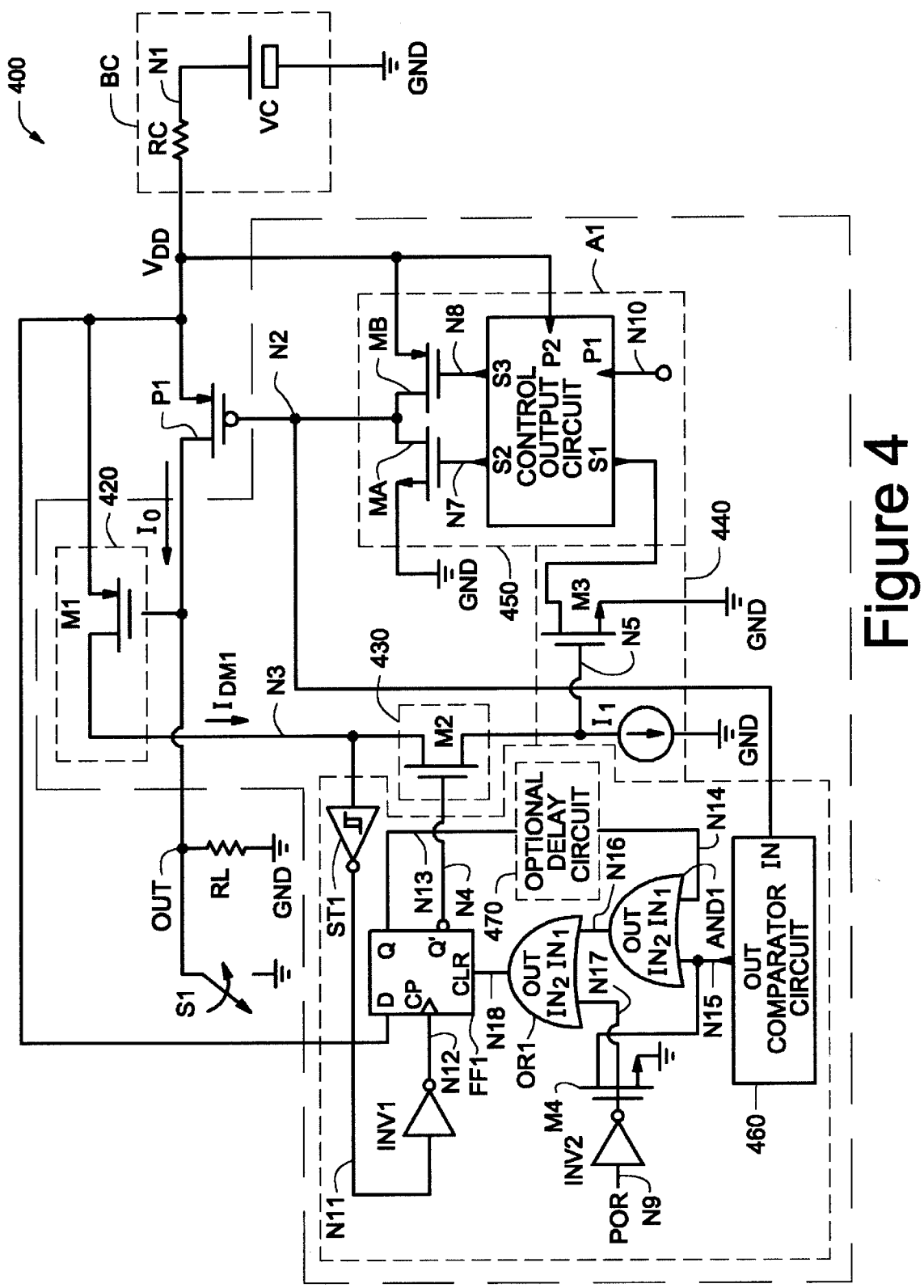
FIG. 4 shows another exemplary schematic diagram of a regulator circuit with discharge interrupt circuit with the logic circuit shown in greater detail.

FIG. 4 shows an exemplary schematic diagram of a regulator circuit with a discharge interrupt circuit. The electronic circuit (400) includes the battery cell (BC), a PMOS device (P1), a load (RL), the discharge interrupt circuit (410), and a control circuit (A1). The battery cell (BC) is represented by a non-ideal supply including a cell voltage supply (VC) and a cell impedance circuit (RC). The discharge interrupt circuit (410) includes a sensor circuit (420), a switching circuit (430), a disable circuit (440), a logic circuit (L1), and two transistors (MA, MB) that are part of a complementary output stage for the control circuit (A1) as shown in FIG. 1. The control circuit (A1) also includes a control output circuit (450). The sensor circuit (420) includes a transistor M1. The switching circuit (430) includes a transistor M2. The disable circuit (440) includes a transistor M3 and a current source I1. The logic circuit (L1) includes a Schmitt trigger circuit (ST1), two logic gates (OR1, AND1), a flip-flop circuit (FF1), two inverter circuits (INV1, INV2), a transistor (M4), a comparator circuit (460), and an optional delay circuit (470). A short circuit event is modeled by the closing of the switch (S1) included at an output node (OUT).

The electronic circuit (400) is connected similarly to the electronic circuit (200) shown in FIG. 2. The cell voltage supply (VC) is coupled between a ground terminal (GND) and a first node (N1). The cell impedance circuit (RC) is coupled between the first node (N1) and a power supply node (Vdd). The PMOS device (P1) includes a gate that is coupled to a second node (N2), a source that is coupled to the power supply node (Vdd), and a drain that is coupled to the output node (OUT). The load (RL) is represented by a resistor that is coupled between the output node (OUT) and the ground terminal (GND).

In the discharge interrupt circuit (410), transistor M1 includes a source that is coupled to the power supply node (Vdd), a gate that is coupled to the output node (OUT), and a drain that is coupled to a third node (N3). Transistor M2 includes a source that is coupled to the third node (N3), a gate that is coupled to a fourth node (N4), and a drain that is coupled to a fifth node (N5). The current source (I1) is coupled between the fifth node (N5) and the ground terminal (GND). Transistor M3 includes a source that is coupled to the ground terminal (GND), a gate that is coupled to the fifth node (N5), and a drain that is coupled a sixth node (N6). The control output circuit (450) includes a first input (P1) that is coupled to a tenth node (N10), a second input (P2) that is coupled to the power supply node (Vdd), a first output (S1) that is coupled to the sixth node (N6), a second output (S2) that is coupled to a seventh node (N7), and a third output (S3) that is coupled to an eighth node (N8). The first transistor (MA) of the complementary output stage includes a gate that is coupled to the seventh node (N7), a source that is coupled to the ground terminal (GND), and a drain that is coupled to the second node (N2). The second transistor (MB) of the complementary output stage includes a gate that is coupled to the eighth node (N8), a drain that is coupled to the second node (N2), and a source that is coupled to a power supply node (Vdd).

In the logic circuit (L1), the Schmitt trigger circuit (ST1) is coupled between the third node (N3) and an eleventh node (N11). The first inverter circuit (INV1) is coupled between the eleventh node (N11) and a twelfth node (N12). The first logic gate (AND1) includes a first input (In1) that is coupled to a fourteenth node (N14), a second input (In2) that is coupled to a fifteenth node (N15), and an output (Out) that is coupled to a sixteenth node (N16). The second logic gate (OR1) includes a first input (In1) that is coupled to the sixteenth node (N16), a second input (In2) that is coupled to a seventeenth node (N17), and an output (Out) that is coupled to a eighteenth node (N18). Transistor M4 includes a gate that is coupled to the seventeenth node (N17), a source that is coupled to the ground terminal (GND), and a drain that is coupled to the fifteenth node (N15). The second inverter circuit (INV2) is coupled between a ninth node (N9) and the seventeenth node (N17). The flip-flop circuit (FF1) includes a first input (D) that is coupled to the power supply node (Vdd), a second input (CP) that is coupled to the twelfth node (N12), a third input (CLR) that is coupled to the eighteenth node (N18), a first output (Q) that is coupled to the thirteenth node (N13), and second output (Q') that is coupled to the fourth node (N4). The optional delay circuit (470) includes an input (In1) that is coupled to the thirteenth node (N13) and an output (Out) that is coupled to the fourteenth node (N14). The comparator circuit (460) includes an input (In) that is coupled to the second node (N2) and an output (Out) that is coupled to the fourteenth node (N14).

The electronic circuit (400) operates similarly to the electronic circuit (200) shown in FIG. 2. The following discussion describes the operation of the logic circuit (L1) in greater detail. As stated in connection with FIG. 2, when the short circuit event occurs, the magnitude of the gate-source voltage ($V_{GS}$) of transistor M1 increases. The magnitude of the drain current ($I_{DM1}$) transistor M1 also increases. The drain current ($I_{DM1}$) of transistor M1 is a function of the gate-source voltage ($V_{GS}$) of transistor M1. As the magnitude of the gate-source voltage ($V_{GS}$) of transistor M1 increases, the magnitude of the drain current ($I_{DM1}$) also increases. The Schmitt trigger circuit (ST1) of the logic circuit (L1) monitors the increase in the magnitude of the drain current ($I_{DM1}$) of transistor M1. The Schmitt trigger (ST1) produces a low logic level (logic "0") at node N11 in response to the drain current ($I_{DM1}$) reaching a predetermined threshold level. Inverter circuit INV1 produces a high logic level (logic "1") at node N12 in response to the low logic level at node N11. The flip-flop circuit (FF1) is "set" or "latched" by a high logic level at node N12, such that the potential at node N4 is set to a low logic level. In this embodiment, setting the potential at node N4 to a low logic level causes transistor M2 to be biased into active operation. Setting transistor M2 active ensures that transistor M2 conducts the current $I_{DM1}$ during the operation of the discharge interrupt circuit (410).

After the high current caused by the short circuit is interrupted, transistor M2 is still biased into active operation by the flip-flop circuit (FF1). To return the electronic circuit (400) to normal operation, the flip-flop circuit (FF1) is reset such that a potential at node N4 to deactivates transistor M2. The flip-flop circuit (FF1) is reset by confirming that the PMOS device (P1) has substantially deactivated. The confirmation is made by the comparator circuit (460), which compares the gate voltage of the PMOS device (P1) to a threshold level of the comparator circuit (460). The comparator circuit (460) produces a high logic level at node N14 when it has determined that the PMOS device (P1) has completely deactivated. The potential at node N13 is a high logic level in response to the short circuit event setting the flip-flop circuit (FF1). Logic gate AND1 produces a high logic level at node N15, which indicates that a short circuit event has occurred and that the PMOS device (P1) has been substantially deactivated. Logic gate OR1 produces a high logic level at the eighteenth node (N18) in response to the high logic level at the sixteenth node (N16). The flip-flop circuit (FF1) is reset by the signal at the eighteenth node (N18). Once the flip-flop circuit (FF1) is reset, transistor M2 is deactivated and the fifth node (N5) is pulled to ground. This deactivates transistor M3 which permits the output current (Io) to be redirected through the PMOS device (P1) to the load (RL).

The optional delay circuit (470) may also be used to delay resetting the flip-flop circuit (FF1) after a short circuit event has occurred. By adding the delay, the PMOS device (P1) remains deactivated for a greater period of time. For example, the optional delay circuit (470) may add a 30 µs delay in resetting the flip-flop circuit (FF1), in comparison to a possible 20 ns delay when the flip-flop circuit (FF1) is reset after a self-timed duration. By delaying the reset of the flip-flop circuit (FF1), the discharge interrupt circuit (410) can compensate for a "chattering" short circuit event. A chattering short circuit event is a short circuit that is repeatedly introduced and removed at the output node (OUT) in rapid succession. For example, when plugging a battery cell into a battery-powered circuit, an intermittent contact may be made between the battery cell and the battery-powered circuit, causing a chatter in the short circuit condition. The response time of the discharge interrupt circuit (410) may be relatively fast such that the flip-flop circuit (FF1) is set and reset for each of these short circuit events. The optional delay circuit (470) allows time for the short circuit to be removed from the electronic circuit (400) before the flip-flop circuit (FF1) is reset. The delay reduces the overall stress on the electronic circuit (400).

In the present embodiment, a power-on reset (POR) signal is used to reset the flip-flop circuit (FF1) as shown in FIG. 4. The POR signal is coupled to node N9. During normal operation, after the power supply has reached an operating range, the POR circuit has a high logic level (logic "1"). The POR signal is inverted by inverter circuit INV2, producing a low logic level (logic "0") at node N16. When the power supply decreases, the POR signal decreases. Once the POR signal decreases below the threshold of the inverter circuit INV2, a high logic level is produced at node N17. The high logic level at node N17 activates transistor M4. When activated, current is pulled through the drain of M4 by circuitry within the comparator circuit (460). This current disables logic gate AND1. By disabling logic gate AND1, the logic circuit (L1) ensures that the discharge interrupt circuit (410) does not activate during a power-up condition. Activating the discharge interrupt circuit during power-up may cause errors in the regulation of the output current (Io).

In light of the discussion above, it is understood and appreciated that other signals effecting the activation and deactivation of the discharge interrupt circuit (410) can also be utilized in conjunction with the logic circuit (L1). In addition, it is appreciated that the Schmitt trigger circuit (ST1) can be replaced by another circuit arranged to monitor the drain current ($I_{DM1}$) of transistor M1. It is also appreciated that the flip-flop circuit (FF1) can be replaced by another circuit such as a latch or other memory circuit, or by a delay network or other delay circuit.

Figure 5:
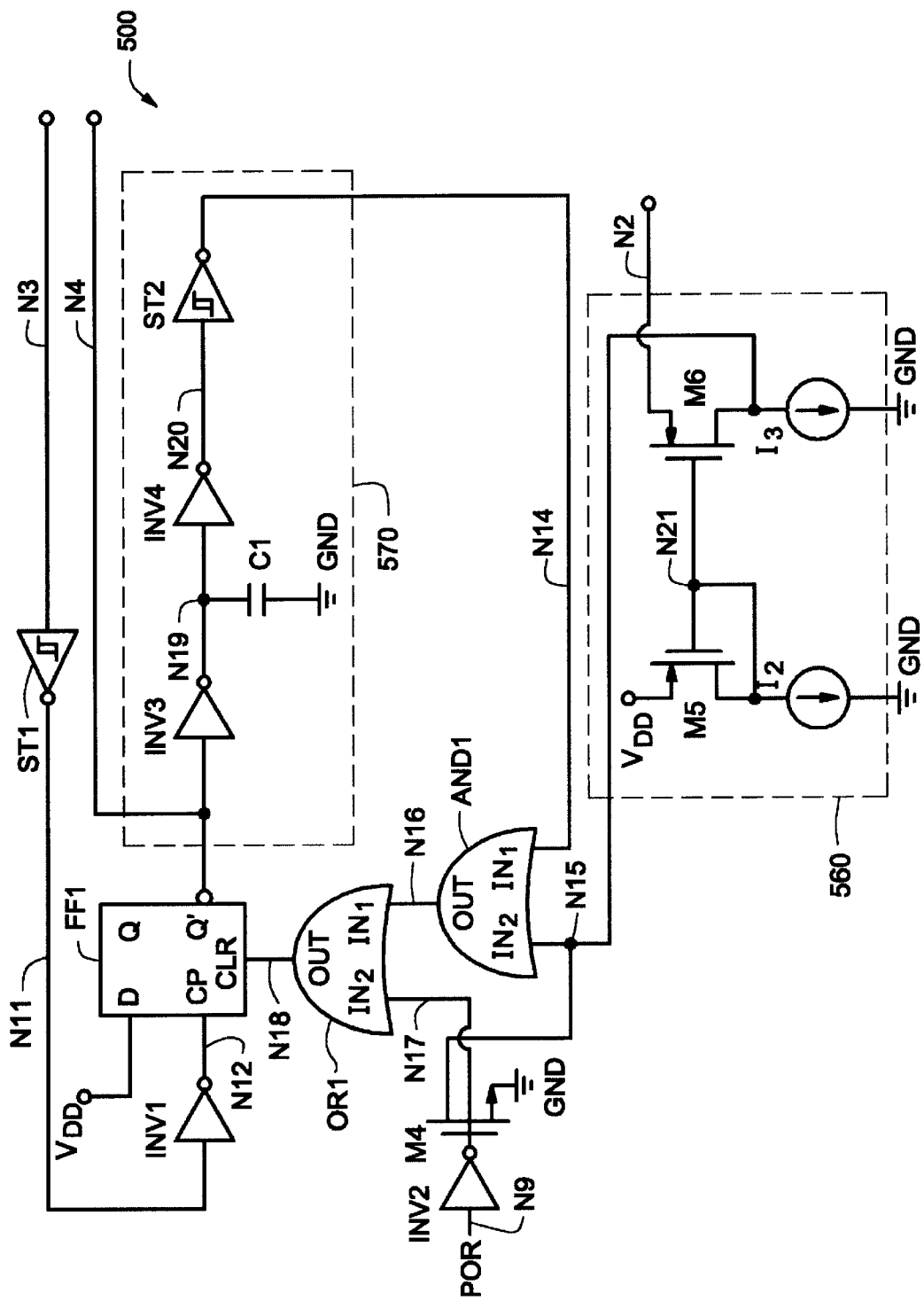
FIG. 5 illustrates a schematic diagram of a logic circuit associated with a discharge interrupt circuit in greater detail.

FIG. 5 illustrates an exemplary schematic diagram of a logic circuit of a discharge interrupt circuit in accordance with the present invention. The logic circuit (500) includes a Schmitt trigger circuit (ST1), two logic gates (OR1, AND1), a flip-flop circuit (FF1), two inverter circuits (INV1, INV2), a transistor (M4), a comparator circuit (560), and a delay circuit (570). The comparator circuit (560) includes two transistors (M5, M6) and two current sources (I2, I3). The optional delay circuit (570) includes two inverter circuits (INV3, INV4) a capacitive circuit (C1), and a Schmitt trigger circuit (ST2).

The logic circuit (500) is connected similar to the logic circuit (L1) shown in FIG. 4. Schmitt trigger circuit ST1 is coupled between node N3 and node N11. Inverter circuit INV1 is coupled between node N11 and node N12. Logic gate AND1 includes a first input (In1) that is coupled to node N14, a second input (In2) that is coupled to node N15, and an output (Out) that is coupled to node N16. Logic gate OR1 includes a first input (In1) that is coupled to node N16, a second input (In2) that is coupled to node N17, and an output (Out) that is coupled to node N18. Transistor M4 includes a gate that is coupled to node N17, a source that is coupled to a ground terminal (GND), and a drain that is coupled to node N15. Inverter circuit INV2 is coupled between node N9 and node N17. The flip-flop circuit (FF1) includes a first input (D) that is coupled to the power supply node (Vdd), a second input (CP) that is coupled to node N12, a third input, or clear input, (CLR) that is coupled to node N18, a first output (Q), and second output (Q') that is coupled to node N4.

In the optional delay circuit (570), inverter circuit INV3 is coupled between node N4 and node N19. Inverter circuit INV4 is coupled between node N19 and node N20. Capacitive circuit C1 is coupled between node N19 and the ground terminal (GND). Schmitt trigger circuit (ST2) is coupled between node N20 and node N14.

In the comparator circuit (560), transistor M5 is diode-connected, including a source that is coupled to the power supply node (Vdd) and a gate and drain that are coupled to node N21. Transistor M6 includes a source that is coupled to node N2, a drain that is coupled to node N15, and a gate that is coupled to node N21. Current source (I2) is coupled between node N21 and the ground terminal (GND). Current source (I3) is coupled between node N15 and the ground terminal (GND).

The logic circuit (500) operates similar to the logic circuit (L1) shown in FIG. 4. The following discussion describes the operation of an exemplary optional delay circuit (570) and the exemplary comparator circuit (560) in greater detail.

When a short circuit event occurs, the flip-flop circuit (FF1) is set and the potential at node N4 decreases to a low logic level. When the potential at node N4 has decreased below a threshold level associated with inverter circuit INV3, inverter circuit INV3 begins to produce a high logic level at its output. Thus, the potential at node N19 transitions from a low logic level to a high logic level in response to the low logic level at the input of inverter circuit INV3. The transition of node N19 to a high logic level is delayed by capacitive circuit C1. The transition time associated with node N19 depends upon the output drive associated with inverter circuit INV3 and the size of the capacitive circuit C1. Inverter circuit INV4 produces a low logic level at its output when the charge on capacitive circuit C1 increasing beyond a threshold level associated with inverter circuit INV4. The potential at node N20 transitions from a high logic level to a low logic level in response to the high logic level at the input of inverter circuit INV4. Schmitt trigger ST2 produces a high logic level at its output in response to the potential at node N20 decreasing below a threshold level associated with Schmitt trigger circuit ST2. A high logic level at node N14 causes the flip-flop (FF1) to reset after the PMOS device is completely deactivated and node N15 is also a high logic level, as described previously in connection with FIG. 4. However, the optional delay circuit (570) creates a delay between the deactivation of the PMOS device (P1) and resetting the flip-flop (FF1). This delay assists in compensating for "chattering" short circuit events as previously described in connection with FIG. 4.

The exemplary comparator circuit (560) provides a high logic level at node N15 when the PMOS device has completely deactivated, as previously described in connection with FIG. 4. Transistors M5 and M6 are arranged with common gates, with the source of transistor M5 coupled to the power supply node (Vdd). Current sources I2 and I3 provide an active pull-down for each of the transistors (M5, M6). The comparator circuit (560) essentially compares the gate-source voltages of transistors M5 and M6 when operated at their respective current levels I2 and I3. Once the voltage at the gate of the PMOS device (P1) connected at node N2 increases beyond the supply voltage (Vdd), the gate-source voltage of transistor M6 will be substantially the same as the gate-source voltage of transistor M5 and a high logic level is produced at node N15. The high logic level at node N15 indicates that the PMOS device (P1) is substantially off.

In one embodiment, transistor M6 is larger than transistor M5. One exemplary ratio in sizes for transistor M5 and M6 is a 10 to 1 ratio. The size difference in the transistors causes a high logic level to be produced at node N15 as the voltage at the gate of the PMOS device approaches the supply voltage. In one example, a high logic level is produced at node N15 when the voltage at the gate of the PMOS device reaches within a voltage margin of approximately 100 mV of the supply voltage (Vdd). In this case, the PMOS device (P1) is substantially deactivated. This ignores sub-threshold currents, which are insubstantial in comparison to the conducting currents of the PMOS device (P1) when active.

In light of the discussion above, it is appreciated and understood that the optional delay circuit (570) shown in FIG. 5 can be replaced by a digital one-shot delay circuit, an analog one-shot delay circuit, or another type of delay circuit. The flip-flop circuit (FF1) can also be replaced by another memory circuit such as a latch. Alternatively, the flip-flop circuit (FF1) can be eliminated and replaced by another delay circuit such as a delay network. The capacitive circuit (C1) can also be replaced by any circuit arranged to create a delay in the feedback between the outputs (Q, Q') and the clear input (CLR) of the flip-flop circuit (FF1). It is also appreciated that the Schmitt trigger circuits (ST1, ST2) can be replaced by an inverter circuit or another level detection circuit. Also, the inverter circuits (INV1–INV4) can be replaced by other circuits such as Schmitt trigger circuits or other circuits. For example, inverter INV1 can be replaced by a CMOS inverter circuit that includes a strong pull-down transistor and a weak pull-up transistor. This CMOS configuration limits the current delivered to the capacitive circuit (C1) such that the capacitive circuit is slowly charges and quickly discharges. This CMOS configuration increases the delay in the feedback between the outputs (Q, Q') and the clear input (CLR) of the flip-flop circuit (FF1). By selecting the sizing ratio between the pull-up transistor and the pull-down transistor, the CMOS configuration allows the delay interval to be further adjusted.

It is also appreciated from the above discussion, that the logic gates (AND1, OR1) can be replaced by other logic that is arranged to reset the flip-flop circuit (FF1) after the output current (Io) has been interrupted for a self-timed or predetermined duration.

Figure 6:
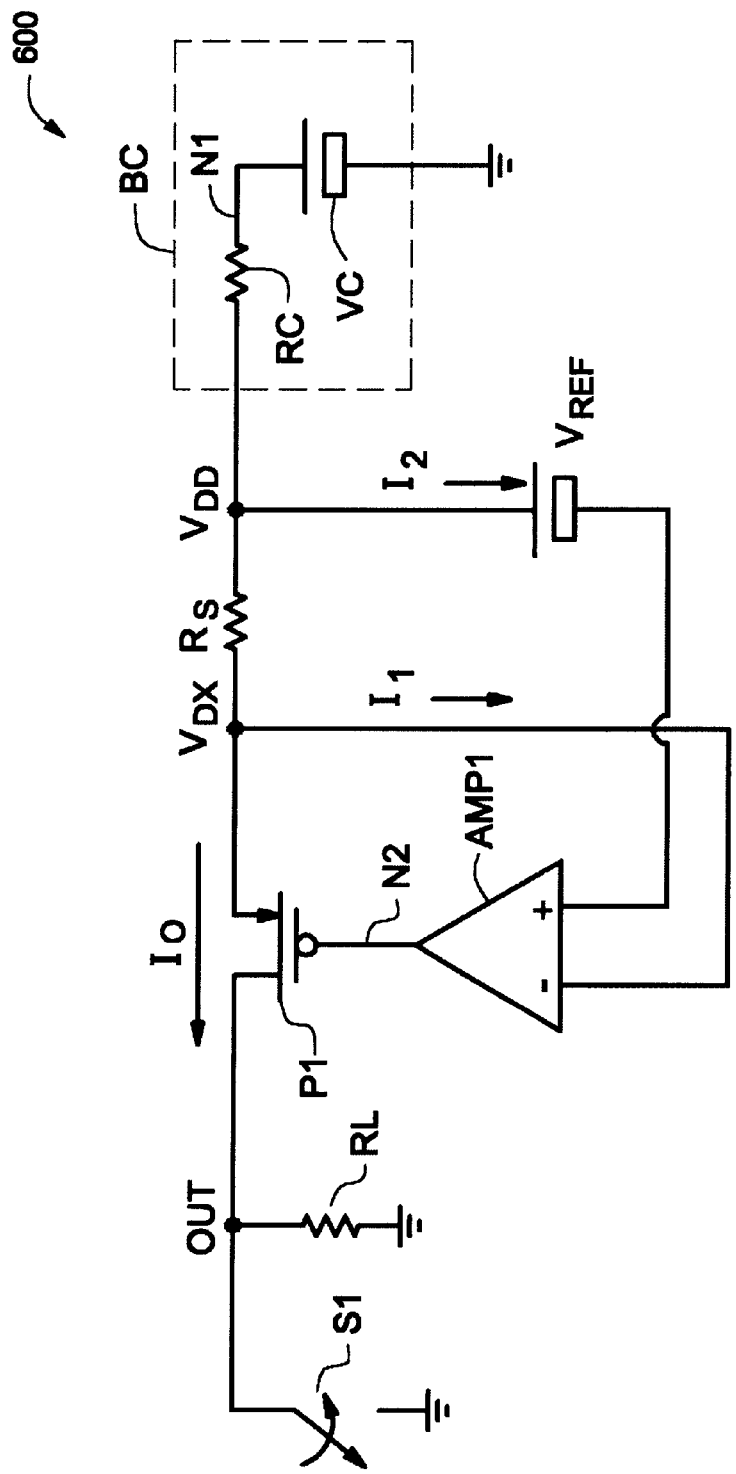
FIG. 6 shows a schematic diagram a linear current regulator circuit as an exemplary operating environment.

FIG. 6 shows an exemplary schematic diagram of a linear current regulator circuit (600) in accordance with the present invention. The linear current regulator is one exemplary operating environment where the present invention can be utilized. The linear current regulator circuit (600) includes a battery cell (BC), a PMOS device (P1), an amplifier circuit (Amp1), a reference circuit (Vref), a resistor (Rs), and a load (RL). The battery cell (BC) is represented by a non-ideal supply including a cell voltage supply (VC) and a cell impedance circuit (RC). A short circuit event is modeled by the closing of the switch (S1) included at an output node (OUT).

The cell voltage supply (VC) is coupled between a ground terminal (GND) and a first node (N1). The cell impedance circuit (RC) is coupled between the first node (N1) and a power supply node (Vdd). The resistor (Rs) is coupled between a first power supply node (Vdd) and a second power supply node (Vdx). The PMOS device (P1) includes a source that is coupled to the second power supply node (Vdx), a gate that is coupled to a second node (N2), and a drain that is coupled to an output node (OUT). The reference circuit is coupled between the first power supply node (Vdd) and the amplifier circuit. (Amp1). The amplifier circuit (Amp1) includes a non-inverting input that is coupled to the reference circuit (Vref), an inverting input that is coupled to the second power supply node (Vdx), and an output coupled to the second node (N2). The load is represented by a resistor that is coupled between the output node (OUT) and the ground terminal (GND).

The linear current regulator circuit (600) is arranged to regulate the flow of output current (Io) through the PMOS device (P1) to a load (RL). The amplifier circuit (Amp1) operates as a control circuit that regulates the level of the output current (Io) delivered to the load (RL). The amplifier circuit (Amp1) monitors the output current (Io) across the resistor (Rs). Through the feedback shown, the amplifier circuit (Amp1) regulates the current through the resistor (Rs) so that the potential across the resistor (Rs) matches the potential corresponding to the reference circuit (Vref). Accordingly, the current through the resistor (Rs) may be expressed as Vref divided by Rs. Currents I1 and I2 have a negligible effect on the measurement of the output current (Io) since the currents at the inputs to an amplifier are nearly zero. The amplifier circuit (Amp1) can be configured to limit the swing the output current (Io) and increase the stability of the current delivered to the load (RL). Also, under steady-state overload conditions, the amplifier circuit (Amp1) may be used to regulate the output current (Io) to a constant level.

Using the present invention in combination with the linear current regulator circuit (600) as the electronic circuit (400) shown in FIG. 4 provides both short circuit protection and regulation of the current provided by the battery cell (BC). As previously stated, when a short circuit event occurs, the output current (Io) begins increasing rapidly. The present invention deactivates the PMOS device (P1) after a short circuit event causing the output current (Io) of the linear current regulator circuit (600) to drop to zero. This allows the linear current regulator circuit (600) to regulate the output current (Io) up from a low current level rather than down from a high current level. The linear current regulator circuit (600) is intended to be one example of an electronic circuit that may be utilized in conjunction with the present invention. It is appreciated and understood in light of this disclosure that other electronic circuits can be used in conjunction with the present invention other than a linear current regulator circuit (600) as shown in FIG. 6.

Figure 7:
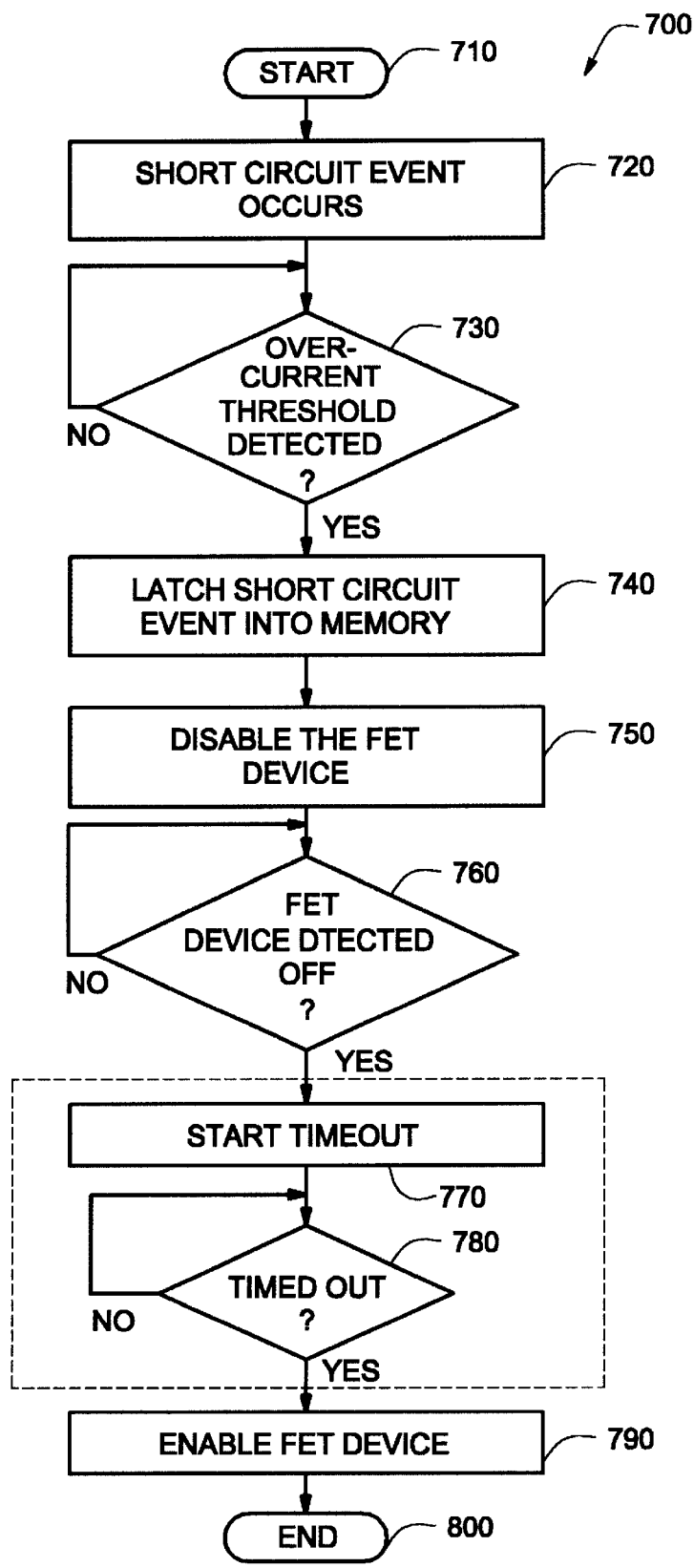
FIG. 7 illustrates a process for the operation of the discharge interrupt circuit in accordance with the present invention.

FIG. 7 illustrates a process (700) for the operation of a discharge interrupt circuit in accordance with the present invention. Processing begins at start block 710. The discharge interrupt circuit is coupled to an electronic circuit such as the exemplary battery-powered circuit shown in FIG. 1. The circuit in FIG. 1 includes a battery cell and a FET device (i.e., PMOS device P1) for which a discharge interrupt circuit may be used to provide short circuit protection. The FET device is operating as an active device.

Advancing to an operation 720, a short circuit event occurs such as a short circuit at the load in a regulated circuit as illustrated in FIG. 1. The short circuit event causes the current at the output of the battery-powered circuit to increase rapidly. The presence of the short circuit can affect the performance of the battery-powered circuit. The short circuit event also can cause a loss in supply voltage from the battery cell resulting in elements of the battery-powered circuit being underpowered, and possibly damage the FET device.

Flowing to a decision block 730, a determination is made of whether the increase in the current described in operation 720 has reached an over-current threshold. An exemplary method of detection is described in connection with FIG. 3 where the gate and source of transistor M1 is coupled across the drain and source of the PMOS device. The drain-source voltage ($V_{DS}$) of the PMOS device is dependent on the level of the output current (Io), whereby $V_{DS}$ rises as the output current Io rises. The magnitude of the gate-source voltage ($V_{GS}$) of transistor M1 also increases simultaneously with the output current Io and $V_{DS}$ of the PMOS device. When the magnitude of the $V_{GS}$ of transistor M1 reaches a threshold corresponding to an over-current through the PMOS device (P1), transistor M1 activates indicating the current increase. If the over-current threshold is not detected, then decision block 730 is repeated. Once the over-current threshold is detected, the process (700) flows to operation 740.

At operation 740, the short circuit event is latched into memory. An example of this process is described in connection with FIG. 4, where the flip-flop circuit (FF1) is "set" in response to the short circuit event. As described above with reference to decision block 730, transistor M1 activates when the short circuit event occurs. The Schmitt trigger circuit (ST1) shown in FIG. 4 monitors the drain current ($I_{DM1}$) of transistor M1. When the Schmitt trigger circuit (ST1) detects an increase in the magnitude of the drain current ($I_{DM1}$) of transistor M1, the Schmitt trigger circuit (ST1) produces a high logic level that sets the flip-flop circuit (FF1).

Advancing to an operation 750, the FET device of the battery-powered circuit is disabled. An example of disabling the FET device is described in connection with FIG. 3, where the logic circuit activates transistor M2 in response to the short circuit event. Activating transistor M2 causes transistor M3 to activate. Transistor M3, when activated, pulls current from gate of transistor MB, causing transistor MB to activate. The PMOS device (P1) shown in FIG. 3 is deactivated in response to the activation of transistor MB which causes a short between the gate and the source of the PMOS device. Once the MOS device is shut off, the process (700) flows to decision block 760.

At decision block 760, a determination is made whether the FET device has been detected as turned off. An example of this operation is described in connection with transistors M5 and M6 as shown in FIG. 5. As discussed supra, the source of one of the transistors (M5) is coupled to the power supply node (Vdd) and the source of the other transistor (M6) is coupled to the gate of the PMOS device (P1). The comparison indicates when the potential at the gate of the PMOS device (P1) has approximately reached the supply voltage (Vdd) such that the PMOS device (P1) is detected as substantially deactivated. Once the FET device is detected as off, the process (700) continues to operation 770.

At operation 770, a time-out is initiated. The time-out refers to a delay, such as the exemplary delay introduced by the delay circuit (570) shown in FIG. 5. The time-out is triggered by the occurrence of the short circuit event. This time-out introduces a delay between the short circuit event and returning the battery-powered circuit to normal operation. The time-out is utilized to compensate for a "chattering" short circuit event as described in connection with FIG. 5. Once the time-out is started by the short circuit event, the process (700) continues with decision block 780.

At decision block 780, a determination is made whether or not the time-out procedure has "timed out". If, for example, node N14 in FIG. 5 is not yet a logic high level, then the time-out has not timed out. When not timed out, decision block 780 is repeated. Once timed out, the process (700) flows to operation 790.

At operation 790, the FET device is enabled returning the electronic circuit coupled to the discharge interrupt circuit to normal operation. For example, the FET can be enabled by resetting the flip-flop circuit (FF1) shown in FIG. 4. Transistor M2 is deactivated in response to resetting the flip-flop circuit (FF1), which in turn deactivates transistor M3. Deactivating transistor M3 deactivates transistor MB, which activates the PMOS device (P1). Once the FET device is enabled, the process (700) continues to end block 790 where the process (700) ends.

Operations 770 and 780 in the previously described process (700) are optional as indicated by the dashed rectangle shown in FIG. 7. Without initiating a time-out, the delay between the short circuit event and returning the battery-powered circuit to normal operation is determined by the size of the transistors used.

In light of the discussion above, it is appreciated and understood that the PMOS device shown in FIGS. 1–5, or the FET referred to in FIG. 7, can be replaced by another device such as an NMOS device, a GaAsFET device, a JFET device, a BJT device, or others. It is also appreciated that the battery cell illustrated in FIGS. 1–6 can be replaced by another power source, and the use of the present invention should not be limited to battery applications.

Also, in light of the discussion above, it is understood and appreciated that the use of the term "short circuit" is meant to include all types of shorts including "soft shorts" and possible effects of a short circuit or equivalents. The present invention provides protection from an over-current event or an excessive load condition, which are often considered effects of a short circuit event. Over-current events or excessive load conditions can be caused by events other than a short circuit. The present invention, by providing protection from over-current events and excessive load conditions, also provides protection from such short circuit equivalents.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An apparatus for providing over-current protection to a regulator circuit that includes a load regulation device, wherein the load regulation device is arranged to regulate a current flow through the load regulation device from a power source in response to a control signal that is produced by a control circuit, comprising:
   a sensor circuit that is configured to sense the current flow through the load regulation device;
   a switching circuit that is coupled to the sensor circuit;
   a logic circuit that is coupled to the switching circuit is configured to activate the switching circuit in response to the occurrence of a short circuit event, and also configured to deactivate the switching circuit after the load regulation device is substantially deactivated; and
   a disable circuit that is coupled to the switching circuit is configured to deactivate the load regulation device when the switching circuit is active by enabling a transistor in an output stage of the control circuit such that the load regulation device is deactivated, whereby the regulator circuit is protected from the short circuit event.

2. The apparatus of claim 1, wherein the regulator circuit is a linear current regulator circuit that is configured to regulate the current flow from the power source to an output load.

3. The apparatus of claim 1, wherein the load regulation device is a FET device and the sensor circuit further comprises a first transistor that is configured to monitor a drain-source voltage of the load regulation device to detect the occurrence of the short circuit event.

4. The apparatus of claim 3, wherein a threshold level of the first transistor is adjusted such that the first transistor is activated when the current flow through the load regulation device exceeds a predetermined level of the drain-source voltage of the load regulation device during the occurrence of the short circuit event.

5. The apparatus of claim 1, wherein the logic circuit is configured to selectively activate the switching circuit such that a sensor current flows from the sensor circuit to the disable circuit when the sensor circuit detects the occurrence of the short circuit event.

6. The apparatus of claim 1, wherein the load regulation device is deactivated in response to enabling the transistor of the output stage of the control circuit when a supply level associated with the power source is less than one volt.

7. The apparatus of claim 1, wherein the control output circuit overrides the control circuit when the short circuit event occurs such that the control signal does not regulate the load regulation device.

8. The apparatus of claim 1, wherein the logic circuit is configured to deactivate the switching circuit in response to a power-on reset signal during a power-up sequence of the control circuit.

9. The apparatus of claim 1, wherein the logic circuit provides a reset signal after the occurrence of a short circuit event.

10. The apparatus of claim 1, wherein the logic circuit further includes a comparator circuit that is arranged to detect when the load regulation device is substantially deactivated, wherein the comparator circuit provides a detection signal when the load regulation device is substantially deactivated.

11. The apparatus of claim 10, wherein the load regulation device is a FET device and the comparator circuit operates as a voltage detector that is arranged to detect a gate-source voltage of the load regulation device and determine whether the gate-source voltage has reached a zero value indicating that the load regulation device is substantially deactivated.

12. The apparatus of claim 10, wherein the load regulation circuit is a FET device and the comparator circuit operates as a voltage detector that is arranged to detect a gate-source voltage of the load regulation device and determine whether the gate-source voltage has reached a threshold level indicating that the load regulation device is substantially deactivated.

13. The apparatus of claim 1, wherein the load regulation device is one of a PMOS device, an NMOS device, a GaAsFET device, a JFET device, and a BJT device.

14. The apparatus of claim 1, wherein the logic circuit is reset after the occurrence of the short circuit event when the detection signal indicates that the load regulation device is substantially deactivated such that the load regulation device returns to operation where the load regulation device is responsive to the control signal.

15. The apparatus of claim 1, the logic circuit further comprising a delay circuit that is arranged to provide a reset signal to the logic circuit a predetermined time interval after the occurrence of the short circuit event.

16. The apparatus of claim 1, wherein the logic circuit operates as one of a flip-flop circuit and a delay network circuit.

17. A method for providing short circuit protection to a regulator circuit that regulates a current flow through a load regulation device, the method comprising:
   detecting the occurrence of a short circuit condition;

setting a latch to indicate the occurrence of the short circuit condition;

disabling the load regulation device when the latch is set such that the current flow through the load regulation device is interrupted;

monitoring the load regulation device to determine when the load regulation device is substantially deactivated;

resetting the latch when the load regulation device is substantially deactivated; and enabling the load regulation device after the latch is reset such that the regulator circuit regulates the current flow with the load regulation device.

18. A method as in claim 17, wherein in the load regulation device is a FET device, the step of detecting further comprising:

monitoring a drain-source voltage of the load regulation device; and detecting when the drain-source voltage has exceeded a predetermined threshold that indicates the occurrence of the short circuit condition.

19. A method as in claim 18, the step of detecting further comprising activating a first transistor when the magnitude of the drain-source voltage of the load regulation device exceeds a threshold voltage of the first transistor.

20. A method as in claim 17, wherein the load regulation device is a FET device, the step of disabling further comprising coupling the gate and source terminals of the FET device together.

21. A method as in claim 17, the step of resetting further comprising:

enabling a time-out circuit when the latch is set; and producing a time-out signal a predetermined time interval after the time-out circuit is enabled.

22. A method as in claim 17, wherein the load regulation device is a FET device, the step of monitoring further comprising:

comparing the gate voltage of the load regulation device to a power supply voltage; and determining when a gate voltage of the load regulation device is within a predetermined margin of the power supply voltage.

23. A method as in claim 17, further comprising resetting the latch in response to a power-on reset (POR) signal that is provided during a power-up sequence of the regulator circuit.

24. An apparatus for providing short circuit protection to a regulator circuit that regulates a current flow through a load regulation device, comprising:

a means for detecting that is configured to detect an occurrence of a short circuit condition within the regulator circuit;

a means for setting a latch that is configured to set a latch to indicate the occurrence of the short circuit condition;

a means for disabling the load regulation device that is configured to disable the load regulation device when the latch is set such that the regulator circuit is disabled;

a means for monitoring the load regulation device that is configured to determine when the load regulation device is substantially deactivated;

a means for resetting the latch that is configured to reset the latch when the load regulation device is substantially deactivated; and a means for enabling the load regulation device that is configured to enable the load regulation device after the latch is reset such that the regulator circuit regulates the current flow with the load regulation device.

25. An apparatus as in claim 24, wherein the load regulation device is a FET device, the means for detecting further comprising:

a means for monitoring that is configured to monitor a drain-source voltage of the load regulation device; and additional means for detecting that is configured to detect when the magnitude of the drain-source voltage has exceeded a predetermined threshold that indicates the occurrence of the short circuit condition.

26. An apparatus as in claim 25, the means for detecting further comprising a means for activating a first transistor that is configured to activate a first transistor when the drain-source voltage of the load regulation device exceeds a threshold voltage of the first transistor.

27. An apparatus as in claim 24, wherein the load regulation device is a FET device, the means for disabling the load regulation device further comprising a means for coupling that is configured to couple the gate and source terminals of the load regulation device together.

28. An apparatus as in claim 24, the means for resetting the latch further comprising:

a means for enabling a time-out circuit that is configured to enable a time-out circuit when the latch is set; and a means for producing a time-out signal that is configured to produce a time-out signal a predetermined time interval after the time-out circuit is enabled, wherein the means for resetting the latch is configured to reset the latch when the load regulation device is substantially deactivated and the time-out signal has occurred.

29. An apparatus as in claim 24, wherein the load regulation device is a FET device, the means for monitoring the load regulation device further comprising:

a means for comparing that is configured to compare a gate voltage of the load regulation device to a power supply voltage; and a means for determining that is configured to determine when the gate voltage of the load regulation device is within a predetermined margin of the power supply voltage.

30. An apparatus as in claim 24, the means for resetting the latch further comprising additional means for resetting latch this is configured to reset the latch in response to a power-on reset (POR) signal that is provided during a power-up sequence of the regulator circuit.

* * * * *

UNITED STATES PATENT AND TRADEMARK OFFICE
CERTIFICATE OF CORRECTION

PATENT NO.     : 6,614,637 B1
DATED          : September 2, 2003
INVENTOR(S)    : Gregory J. Smith It is certified that error appears in the above-identified patent and that said Letters Patent is hereby corrected as shown below:

Column 5,
Line 14, please change "(SI)" to -- (S1) --.

Column 7,
Line 47, please change "13" to -- I3 --.

Column 13,
Line 53, please change "12" to -- I2 --.
Line 53, please change "13" to -- I3 --.

Column 16,
Line 2, please change "lo" to -- Io --.

Signed and Sealed this

Second Day of December, 2003

JAMES E. ROGAN
*Director of the United States Patent and Trademark Office*